Sheet 1, 2 Sheets.

L. Moore.

Grain Drill.

No. 1,393. Reissued Feb. 3, 1863.

THE NORRIS PETERS CO., WASHINGTON, D.C.

Sheet 2, 2 Sheets.

L. Moore.

Grain Drill.

No. 5,522. Patented Apr. 18, 1848.

No. 1,393. Reissued Feb. 3, 1863.

THE NORRIS PETERS CO., WASHINGTON, D. C.

UNITED STATES PATENT OFFICE.

LEWIS MOORE, OF YPSILANTI, MICHIGAN.

IMPROVEMENT IN GRAIN-DRILLS.

Specification forming part of Letters Patent No. 5,522, dated April 18, 1848; Reissue No. 1,393, dated February 3, 1863.

*To all whom it may concern:*

Be it known that I, LEWIS MOORE, formerly of Bart, Pennsylvania, now of Ypsilanti, in the county of Washtenaw and State of Michigan, have invented a new and useful Improvement in Grain-Drills; and I do hereby declare the following to be a full and exact description of the same, reference being had to the accompanying drawings, making part of this specification, in which—

Figure 1:
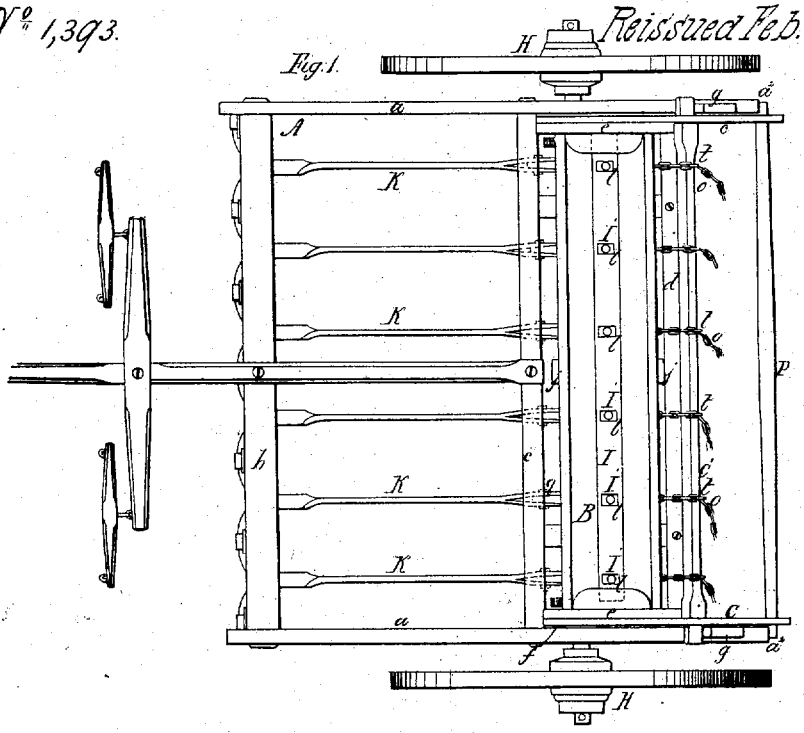
Figure 2:
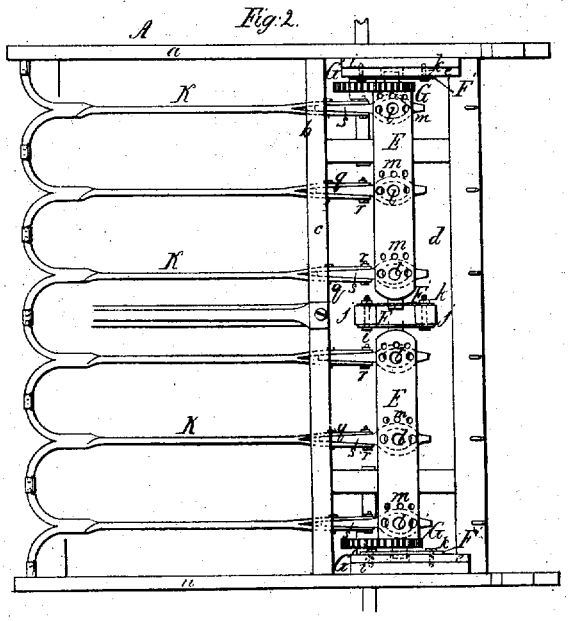
Figure 3:
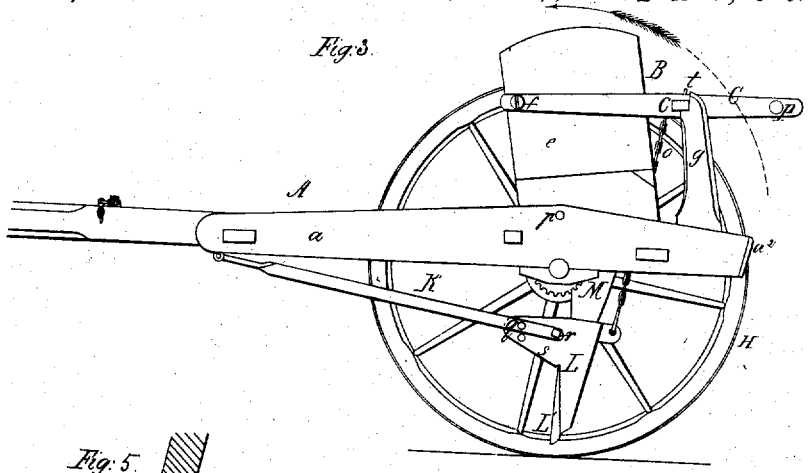
Figure 5:
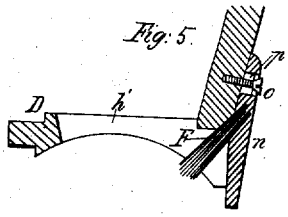
Figure 4:
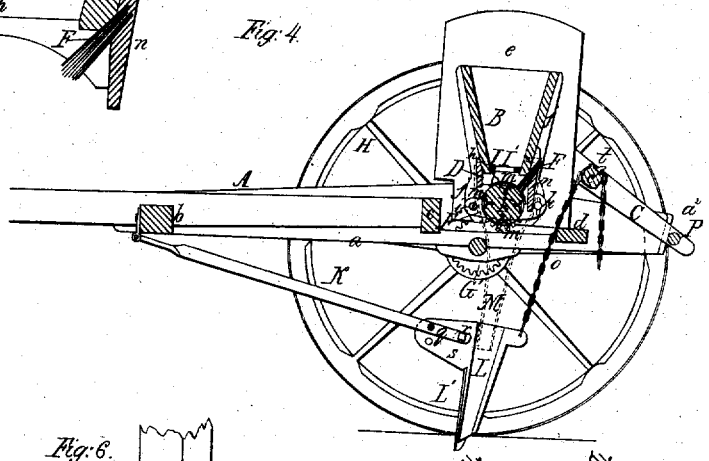
Figure 6:
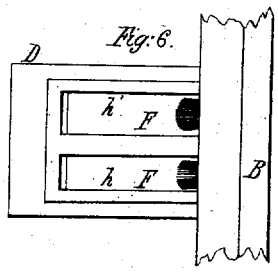
Figure 7:
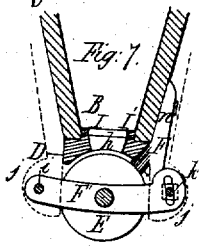

Figure 1 is a top view of the machine. Fig. 2 is a top view of the same with the hopper and some other parts removed. Fig. 3 is a side elevation of the machine. Fig. 4 is a vertical longitudinal section of the same. Fig. 5 is a section through one of the casting and movable brushes on the lower part of the hopper. Fig. 6 is a top view of the same. Fig. 7 is a section through one of the castings and brushes on the lower part of the hopper, showing the relation of the sowing-cylinders and segment-slotted box-plates.

Similar letters in the figures refer to corresponding parts in the several figures.

My said improvements relate chiefly to machines in which the delivery of seed is effected or regulated by rotating cylinders placed below or above the hopper-bottom.

The present invention consists, first, in a device for adjusting the seeding-cylinders in respect to the hopper-bottom or other part of the machine to regulate the supply of seed; second, in a device for throwing the seeding mechanism in or out of gear; third, in a device for raising and lowering the drill-teeth.

To enable others skilled in the art to which my invention appertains to fully understand and use the same, I will proceed to describe its construction and operation.

A is the drill-frame, consisting of two side timbers, *a a*, connected together by cross-ties *b c d*.

B is the hopper, suspended between the side timbers, *a*, on horizontal journals *p*, projecting from the end pieces or heads *e* of the hopper and passing through openings in said timbers.

C are levers turning on pins or screws *f* inserted in the ends of the hopper at one end, and connected together at their opposite ends by a horizontal bar, C′, extending crosswise from one to the other, and projecting beyond the outer sides of the same, in order that its ends may be caused to rest in offsets formed in the upper ends of the inclined timber *g* in the frame when desired to stop sowing, as hereinafter explained.

D are castings secured to the lower part of the hopper, at the required distances apart, in any convenient manner, curved on their lower parts to correspond with the peripheries of the sowing-cylinders, and having two or more oblong openings, *h h′*, in them, of different sizes, for the passage of the grain from the hopper.

E are the sowing-cylinders, arranged on the same horizontal line immediately below the castings D on the bottom of the hopper, and turning on journals projecting from their ends and entering openings in cast box-plates F′, secured to the end pieces or heads *e* of the hopper, and to blocks of wood *j* on the sides and near the middle of the hopper, and projecting below the same. The plates F′, just mentioned, for supporting the journals of the sowing-cylinders are secured to the lower parts of the end pieces or heads *e* of the hopper and the lower parts of the timbers *j* by screws *i*, passing through openings in one end of said plates, and by screws *k*, passing through segment-slots at their opposite ends, scribed from the centers of the first-mentioned screws *i*, upon which said plates move, so as to allow of said cylinders being moved up and down on a segment-line to adjust them to the castings, and brushes on the lower part of the hopper to regulate the quantity of grain to be sown. The sowing-cylinders have large and small cavities *l m* formed in straight lines around their peripheries immediately below the openings in the castings for the reception of the grain, the larger cavities *l* being formed in the cylinders immediately below the larger openings or slots *h′* in the castings and the smaller cavities *m* immediately below the smaller openings *h* in the castings.

F are inclined brushes, resting against the peripheries of the cylinders above the cavities in the same, and passing through openings in the castings D, and inserted at their upper ends into openings in a transverse board, *n*, secured to the side of the hopper by screws *o*, passing through oblong slots *p* in the same, so as to allow said board to be lowered with the brushes as their lower ends wear away. These brushes are for the purpose of brushing back the grain and saving it from being broken and the cylinder from being worn.

G are pinions or cog-wheels secured to the outside ends of the cylinders and meshing in gear with similar cog-wheels, G′, on the horizontal axles of the driving-wheels, turning in boxes in the sides *a a* and parallel timbers of the drill-frame.

H are the driving-wheels of the machine, which are by preference made with iron hubs, but may be of any suitable construction.

I is a movable slide, slat, or gage in the hopper at the bottom of the same, resting on the upper surfaces of the castings D and perforated with oblong openings I′, similar to and corresponding with those in the castings when the slide is moved to the right or left, and made to move over the same in order to bring said openings over either the smaller or larger set of openings in the castings and cavities in the cylinders to suit the kinds of grain desired to be drilled.

K K are a series of inclined iron bars or beams, curved and brought together at their forward ends, and having journals on the said curved ends, which turn in boxes secured to the forward cross-timber *b* of the frame, and divided at their rear ends so as to form prongs which embrace wings *s*, projecting from the upper forward part to the tubular drill, and are attached to the same by two pins, *q r*, passing through the prongs and said wings, the forward pin, *q*, being made of wood in order to break when the drill comes in contact with a rock or other hard substance, and the hinder iron pin, *r*, serving as a journal on which the drill turns.

L are the iron winged tubular drills, attached to the bars or beams K by the pins *q r*, as above stated. The wooden pins *q* pass through openings in the wings at their forward parts and corresponding openings in the bars or beams, so as to set the tubes at the proper angle of inclination, and in case of the drill striking a rock or hard substance to break and allow the drill to turn on the iron pin *r* and pass over said rock or other hard substance, and thus prevent the tubular drill being broken.

M are leather spouts, secured to the lower part of the hopper, immediately below the cavities in the cylinders, and extending into the tubular drills below, so as to prevent the escape of the grain and conduct it into the furrows.

L′ is a wrought-iron nosing or cutter, fastened to the front of each tubular drill, for opening the furrow and preventing the tube being worn. This nosing may be easily renewed whenever worn.

O are chains attached to wings or projections on the upper back parts of the tubes, and attached to pins *t*, projecting from the upper surface of the horizontal bar C′.

P is a round or bar attached to the ends of the lever C, and extending from one to the other, by which the operator raises or lowers said levers, and thus moves the hopper forward, throws the cog-wheel G out of gear, and raises the tubular drills L out of the ground simultaneously. The ends of this round or bar P project beyond the outer sides of the said levers C, in order that its ends may rest against the back ends of the drill-frame A at $a^2$, to hold it from going out of gear when in operation. The ends of the side timbers, *a*, are inclined downward and inward for the purpose of holding the hopper to its place, as represented in Fig. 4. The cavities *m* in the sowing-cylinders are provided with screws to alter their sizes to suit different kinds of sowing.

Operation: The machine being first drawn by horse or other power to the proper situation in the field, and the levers C, hopper B, and winged tubular drills L lowered to the positions represented in Fig. 4, and the sliding slat or gage I moved so as to bring the openings I′ in the same over the openings *h* in the castings D, and cavities *l m* in the cylinder E suited to the size and nature of the grain contained in the hopper, the machine is drawn over the parts of the field where the grain is to be sown. The act of drawing the machine on the wheels causes the sowing-cylinders to turn in a reverse direction to the driving-wheels by the cog-wheels G G′, and the grain to be carried around in the cavities in the cylinders with their revolutions, and to be discharged into the leather spouts M, which conduct it into the respective tubular drills, L, with which they communicate, by which it is conducted into the furrows formed by cutters or nosings L′ on the forward parts of the tubes, the grain being prevented from escaping from the hopper between the castings D and cylinders E, except through the cavities *l m* in the cylinders, by the brushes F, which also regulate the amount of grain to be conveyed into the spouts by the cavities in the cylinders during their revolutions. When it is desired to stop the sowing during the progress of the machine the levers C are raised and the ends of the bar C′ inserted in the notches of the post *g*, which throws the hopper forward on the arc of a circle, of which the journal *p* of the hopper forms the center, as indicated by the dotted line and arrow in Fig. 3, and disengages the cog-wheels G on the sowing-cylinders from gear with the cog-wheels G′ on the main driving-axles.

To accurately regulate the quantity of seed deposited, the box-plates F′ may be set up or down to adjust the sowing-cylinders in their proximity to the perforated castings D or hopper-bottom.

It will be manifest that this device is alike applicable to sowing-cylinders placed either above or below the hopper-bottom.

Having thus described my invention, the following is what I claim as new therein and desire to secure by Letters Patent:

1. The box-plates F′, employed to adjust a seeding-cylinder or seeding-cylinders in respect to the hopper-bottom or other suitable part of the machine to regulate the supply of grain, substantially as set forth.

2. The combination and arrangement of the levers C, bars C′ P, and journals *p* with the hopper B, frame A, and supports *g*, for moving the hopper and sowing-cylinders in the arc of a circle, substantially as and for the purpose set forth.

3. The combination of the chains O with the tubes L and bar C′ of the hopper-frame, by which the tubes are raised or lowered simultaneously with the turning of the hopper on its axis, as described.

LEWIS MOORE.

Witnesses:
F. T. BOGARDUS,
S. H. BOGARDUS.